(No Model.)
G. PFANNKUCHE.
REGULATION OF ALTERNATING ELECTRICAL CURRENT GENERATORS.
No. 405,174. Patented June 11, 1889.
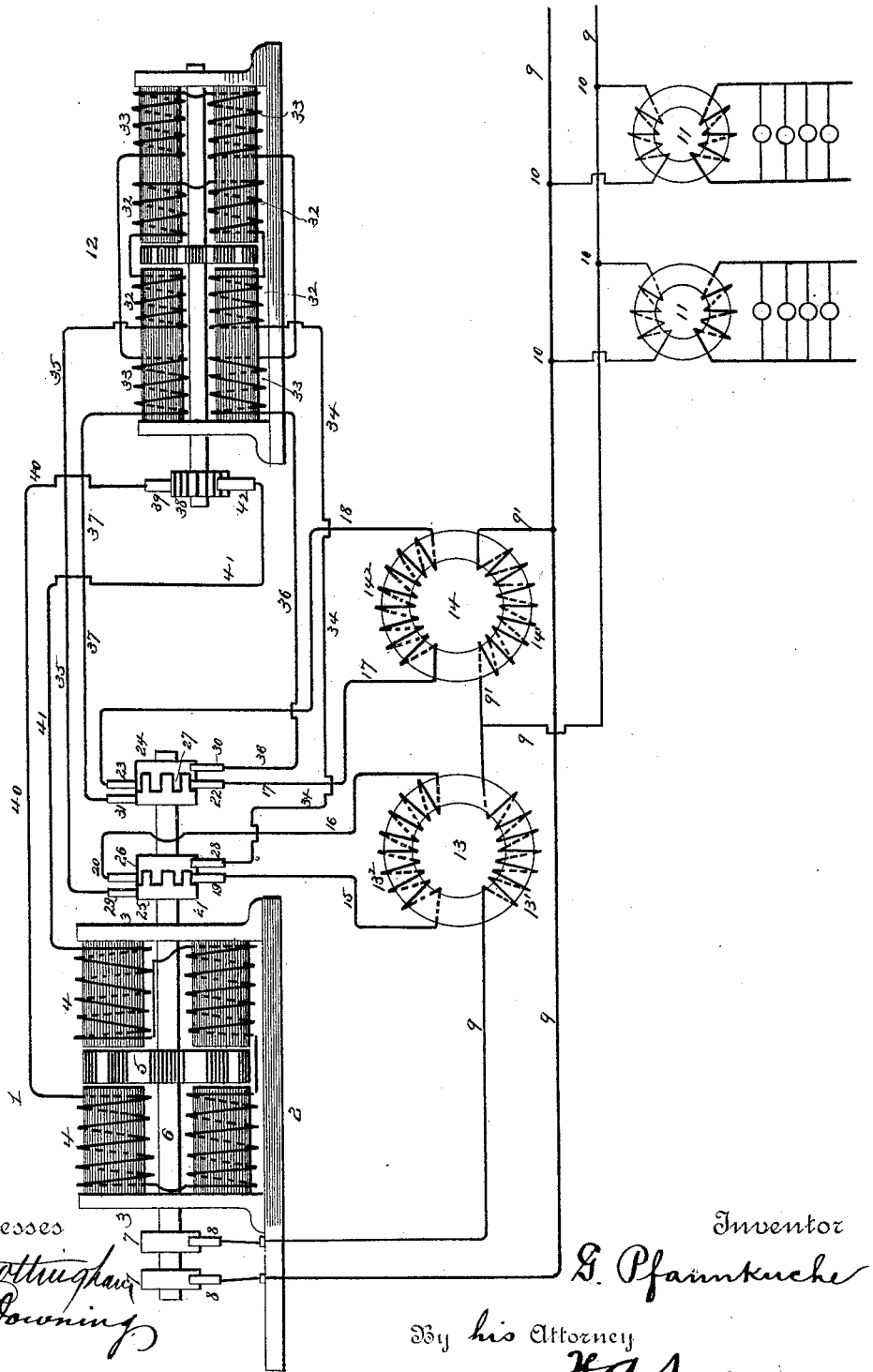
Witnesses
E. M. Nottingham
G. F. Downing
Inventor
G. Pfannkuche
By his Attorney
H. A. Seymour

UNITED STATES PATENT OFFICE.

GUSTAV PFANNKUCHE, OF CLEVELAND, OHIO, ASSIGNOR TO THE BRUSH ELECTRIC COMPANY, OF SAME PLACE.

REGULATION OF ALTERNATING ELECTRICAL CURRENT GENERATORS.

SPECIFICATION forming part of Letters Patent No. 405,174, dated June 11, 1889.

Application filed November 30, 1887. Serial No. 256,513. (No model.)

*To all whom it may concern:*

Be it known that I, GUSTAV PFANNKUCHE, of Cleveland, in the county of Cuyahoga and State of Ohio, have invented certain new and useful Improvements in the Regulation of Alternating Electrical Current Generators; and I do hereby declare the following to be a full, clear, and exact description of the invention, such as will enable others skilled in the art to which it appertains to make and use the same.

My invention has reference to improvements in the regulation of alternating electrical current generators, whereby the latter become adapted for use in general systems of distribution in which the number of translating devices is variable. It is more especially designed for use in connection with such systems of distribution in which the translating devices are in multiple-arc branches derived from a main or trunk line, and in which it is desired to maintain constant difference of potential at the terminals of the derived branches or working-circuits, which are frequently at great distances from the generator. In such systems, as in all systems of distribution, the difference of potential at the brushes of the generator is dependent upon the relation of the external resistance to the total resistance in such manner that when the external resistance increases the difference of potential at the brushes also increases, while at the same time less current is generated in the armature, and when the external resistance decreases the difference of potential at the brushes also decreases, and more current is at the same time generated in the armature. From this it becomes clear that in a multiple-arc system of distribution, whenever one or more working branches are opened, provision should be made to decrease the strength of the field-magnets, and whenever additional working-circuits are closed the strength of the field-magnets should be increased in order to maintain a constant difference of potential, substantially as in constant-potential dynamos for incandescent electric lighting.

The object of my invention is to accomplish this result automatically and effectively in a separately-excited alternating-current generator, or any number of such generators, and I provide for this purpose a separately-excited exciter, which furnishes currents of one direction to the field-magnet coils of the alternating-current generator or generators, and the arrangement is such that the strength of the current furnished is controlled by the difference of potential at the brushes of the alternating-current generator. For this purpose the field-magnets of the exciter are charged by the currents generated in the alternating-current generator, which currents, however, are first straightened out by suitable commutators before they reach the field-coils of the exciter. The currents furnished by the alternating-current generator or generators are ordinarily of comparatively very high tension, and especially so if they are intended to be used for the operation of induction-transformers or secondary transformers, or other like translating devices, and these currents are not well suited for charging the field-coils of the exciter. For this reason, instead of charging these field-coils directly by the currents from the alternating-current generator, I cause these currents to be transformed into currents of suitable lower tension before they reach the commutator above referred to, so that excessive sparking at said commutator is prevented, and the current will reach the field-coils of the exciter with such tension as is suited for the functions which it is designed to perform. For this purpose I employ two induction-transformers, the primary coils of which are placed, respectively, in the main line and in a branch derived from the same, so that they will act in the same sense, and their secondary coils will yield independent currents depending upon the amount of current in the main line and upon the difference of potential at the brushes of the alternating-current generator, respectively; and these currents, after being straightened out by the two commutators above referred to, will each charge a separate set of field-coils of the exciter, which in turn will charge the field-coils of the alternating-current generator in accordance with the demands of the system. All this will more fully appear from the following detailed description, in which reference is made to the accompanying drawing, which represents in diagram one of the numerous forms which my invention may assume.

In the drawing there is shown an alternating-current generator 1, which may be of any ordinary or improved construction. It is represented in the drawing as mounted upon a base-plate or platform 2, upon which standards 3 3, of iron, are bolted, and which standards constitute the yokes of the field-magnets 4 4. The armature 5, which is preferably of the Brush type, is mounted upon a shaft 6, which may be journaled in the standards, and is driven in any suitable manner. The alternating currents generated in this machine, which when started depends for the generation of current upon the residual magnetism of the field-cores, are collected by brushes 8 8, bearing upon the collecting-disks 7 7, secured to but insulated from the shaft and having the terminals of the armature-coils connected therewith. All these parts may be of ordinary construction, well understood by these skilled in the art, and need not be specifically described.

With the collecting-brushes 8 8 the main or trunk line 9 9 is connected, and at distant points 10 10, &c., this line is tapped by multiple-arc branches in which suitable translating devices are included. The translating devices 11 11, &c., (shown in the drawing,) are in fact inductoriums designed to convert currents of a given tension into currents of different tension, substantially as set forth in patent to Charles E. Brush, No. 219,209.

The alternating-current generator used in the system here shown is constructed to furnish currents of comparatively very high tension, and the inductoriums or secondary transformers are therefore arranged with their primary coils in the multiple-arc branches 10 10, &c., while their secondary coils include translating devices adapted to be operated by currents of comparatively low tension, like incandescent electric lamps, &c. It will be understood, however, that while my system is eminently adapted for the operation of secondary transformers it is by no means confined to the feeding of such transformers. Any other suitable translating devices may be substituted for the secondary transformers 11 11. The field-coils of generator 1 are charged by an exciter 12, the field-coils of which are themselves charged by the current from the alternating-current generator 1, as will presently appear.

Two transformers 13 14, of any suitable or improved construction, are arranged with their primary coils 13' 14', of fine wire, in the main line 9 9 and in a branch 9' 9' thereof, respectively. The terminals of the secondary coil $13^2$ are connected by wires 15 16 with brushes 19 20 of a commutator 21, mounted upon but insulated from shaft 6. Similarly the terminals of the secondary coil $14^2$ are connected by wires 17 18 with brushes 22 23 of a commutator 24, also mounted upon but insulated from shaft 6. Each of these commutators 21 and 24 is composed of two hollow cylindrical blocks 25 and 26, which are provided at one end with a number of segmental teeth 27, alternating with segmental spaces, and the two blocks of each commutator are so mounted upon the armature-shaft that the teeth of each block engage the corresponding spaces in the other, with insulating material (indicated by heavy lines) intervening between the two blocks. These brushes bear on diametrically-opposite sides upon the segmental portions of their respective commutators, as shown. In addition to this there are two brushes for each commutator 28 29 and 30 31, respectively, bearing upon the smooth cylindrical portions of the blocks, and each pair is connected with a separate set of coils upon the field-magnets of the exciter. Brushes 28 and 29 of commutator 21 are connected by wires 34 and 35 with a set of field-coils 32 32, arranged in series, as shown, while brushes 30 and 31 of commutator 24 are connected by wires 36 and 37 with a set of field-coils 33 33. The two sets of field-coils are wound upon their cores side by side and in the same direction, so that they will co-operate to magnetize these cores.

The commutator 38 of the exciter is of ordinary construction for sending straight currents to the external circuit, which starts from commutator-brush 39 and passes by conductor 40 to and through the field-coils 4 4 of the alternating-current generator, and returns by conductor 41 and brush 42 to the commutator and to the armature 43 of the exciter.

The total number of segments in each commutator 21 24 is equal to the number of alternations of current in generator 1, and these segments are so located upon shaft 6 relative to the coils of armature 5 that one brush of each pair 19 20 and 22 23 will bear upon a segment of one of the blocks 25 26, while the other of these brushes will bear upon a segment of the other block during the prevalence of one electrical impulse.

It will now be easily understood that the alternating currents from the line reaching the primary coils 13' 14' of the transformers 13 14 will generate alternating currents of low tension in the secondary coils, and that these electrical impulses will be straightened out by the commutators 21 24. The currents reaching commutator 21 from transformer 13 will leave the same as a straight current by one of the brushes 28 29, and after having traversed the set of coils 32 upon the field-magnets of the exciter will return by the other brush. Similarly the currents reaching commutator 24 from transformer 14 will leave the same as a straight current by one of the brushes 30 31, and after having traversed the set of coils 33 will return by the other of these brushes.

It will be noticed that the primary coil of transformer 13 receives the whole line-current, while the primary coil of transformer 14 only receives a branch of said current through the derived circuit 9' 9', and I rely for the regulation of my system upon the combined action of these two transformers.

The automatic regulation to a constant difference of potential at the terminals of working-circuits in a system of distribution provided with my apparatus can now be explained.

The alternating-current generator and the exciter are started simultaneously, and since the fields of neither of these machines are at that moment separately charged the generation of current in their armatures depends for the time being upon the residual magnetism of their field-magnets unless provision is made for temporarily charging these field-magnets, as is well understood by those skilled in the art. Upon starting, therefore, the currents will be necessarily weak. The current furnished by the exciter, weak as it is, will be sufficient to energize perceptibly the field of the alternating-current generator, and the currents furnished by the latter will in turn charge the primaries of the transformers 13 14, the secondaries of which will in turn charge the field-coils of exciter 12. Thus it will be seen that both machines will, after a few moments, reach their maximum power. This power in the case of the alternating-current generator depends first upon the current furnished by the exciter and then upon the external resistance of the line, while in the case of the exciter its power depends altogether upon the currents passing through the line, and therefore through the primary coil of converter 13, and upon those diverted through the primary coil of converter 14; but it will be understood that the current diverted into the primary coil of converter 14 depends upon the difference of potential at the brush-terminals of the alternating-current generator and, consequently, upon the resistance of the line. Suppose, now, that both machines are started when a given number of translating devices like the secondary transformers 11 11 are at distant points included in the multiple arc branches 10 10 from the main line, and that in that condition of the system the alternating-current generator furnishes the required current to the line and produces the required difference of potential. If now additional multiple-arc branches 10 10 are introduced, the external resistance of the prime generator will be reduced, and in consequence thereof, as stated above, the difference of potential at the brush-terminals of generator 1 will at once decrease, while at the same time more current will be generated as required by the increased number of translating devices. In consequence of the increase of current in the line more current will be generated in the secondary coil $13^2$ of transformer 13 and more current will pass through field-coils 32 32, thus tending to increase the intensity of the field of the exciter. In consequence of the decrease of difference of potential less current than before will be diverted through shunt 9' 9' into the fine-wire coils of transformer 14, less current will be generated in the coarse-wire coils $14^2$ of said transformer, and less current than before will pass through field-coils 33 33, thus tending to decrease the intensity of the field of the exciter; but the conditions are such that the sum total of current generated in coils $13^2$ $14^2$ will be increased, from which it follows that the exciter will itself be more strongly excited than before and will generate more current, which, starting from brush 39 of commutator 38, will pass by wire 40 to and through the coils of the field-magnet of the alternating-current generator 1 and return by wire 41 and brush 42, and will produce a more intense field at the generator 1. The difference of potential of generator 1 will thereby be raised as required. Thus it will be seen that such change in the external resistance as will tend to decrease the difference of potential at the brush-terminals will automatically operate to re-establish or maintain the original difference of potential. If, on the contrary, some of the multiple-arc branches 10 10 are opened and the external resistance of the line increased, less current will be generated in armature 5 and the difference of potential at the brush-terminals will be increased. As a consequence of this more current will be diverted through shunt-wires 9' 9' into the fine-wire coil of transformer 14, more current will be generated in the coarse-wire coils of said transformer, while the diminished current of the line passing through the fine-wire coils of transformer 13 will generate a diminished current in the coarse-wire coils of the latter. The sum total of the currents generated in the two coarse-wire coils $13^2$ $14^2$, however, will be diminished, and for reasons which are now apparent the strength of the field of generator 1, and therefore the difference of potential at its brush-terminals, will be reduced, thus re-establishing the normal difference of potential.

It is clear that my system will operate to maintain a constant difference of potential, whether the change of external resistance is caused by the closing or opening of working branches or by any other cause, for it responds to and reacts upon variations of difference of potential irrespective of the causes which produce or tend to produce the same. No artificially-introduced resistance and no manipulations of any kind are necessary to the effective operation of my invention, which is absolutely automatic.

I desire to be understood that I do not limit myself to the identical details of construction herein shown and described. These details may be varied and modified at will so long as the fundamental rules laid down in this specification are adhered to. These rules may also be applied without material change to the automatic regulation of the difference of potential in a system of distribution fed by two or more alternating-current generators.

Having now fully described my invention, I claim and desire to secure by Letters Patent—

1. In a system of electrical distribution, the combination, with an alternating-current dynamo and a separate exciter, including the field-magnet coils of the alternating-current generator and provided with two separate sets of field-magnet coils, of induction apparatus included in the main line of the alternating-current generator and in a branch from the same for energizing the separate sets of coils on the field-magnets of the exciter, substantially as set forth.

2. In a system of electrical distribution, the combination of an alternating-current dynamo and a separate exciting-dynamo for energizing the field of force of the alternating-current dynamo, of two inductoriums, the primary coil of one of which is in the main line and the primary coil of the other in a branch of the main line, said inductoriums being alternately connected with separate sets of coils on the field-magnets of the exciter and adapted to energize the same, substantially as set forth.

3. In a system of electrical distribution, the combination, with an alternating-current generator and a separate exciting-dynamo, the latter having two distinct sets of field-coils, of inductoriums for transforming the current of the alternating-current generator into secondary currents for energizing the two sets of field-coils of the exciter, substantially as set forth.

4. In a system of electrical distribution, the combination, with an alternating-current dynamo and a separate exciting-dynamo provided with separate sets of field-magnet coils, of inductoriums constructed to transform and reduce the tension of the current of the alternating-current dynamo and connections for utilizing such secondary currents for energizing separate sets of field-magnet coils of the exciting-dynamo, substantially as set forth.

5. In a system of electrical distribution, the combination, with an alternating-current dynamo and a separate exciting-dynamo provided with separate sets of field-magnet coils, of inductoriums included in the main line of the alternating-current dynamo and in a branch of the same and commutators whereby separate sets of field-magnet coils of the exciter are energized by the secondary currents of the inductoriums, substantially as set forth.

In testimony whereof I have signed this specification in the presence of two subscribing witnesses.

GUSTAV PFANNKUCHE.

Witnesses:
ALBERT E. LYNCH,
PAUL KESTER.